Aug. 30, 1932.    L. A. GEBHARD    1,874,958
COUPLING SYSTEM FOR HIGH FREQUENCY TRANSMITTERS
Filed Dec. 22, 1928    2 Sheets-Sheet 1
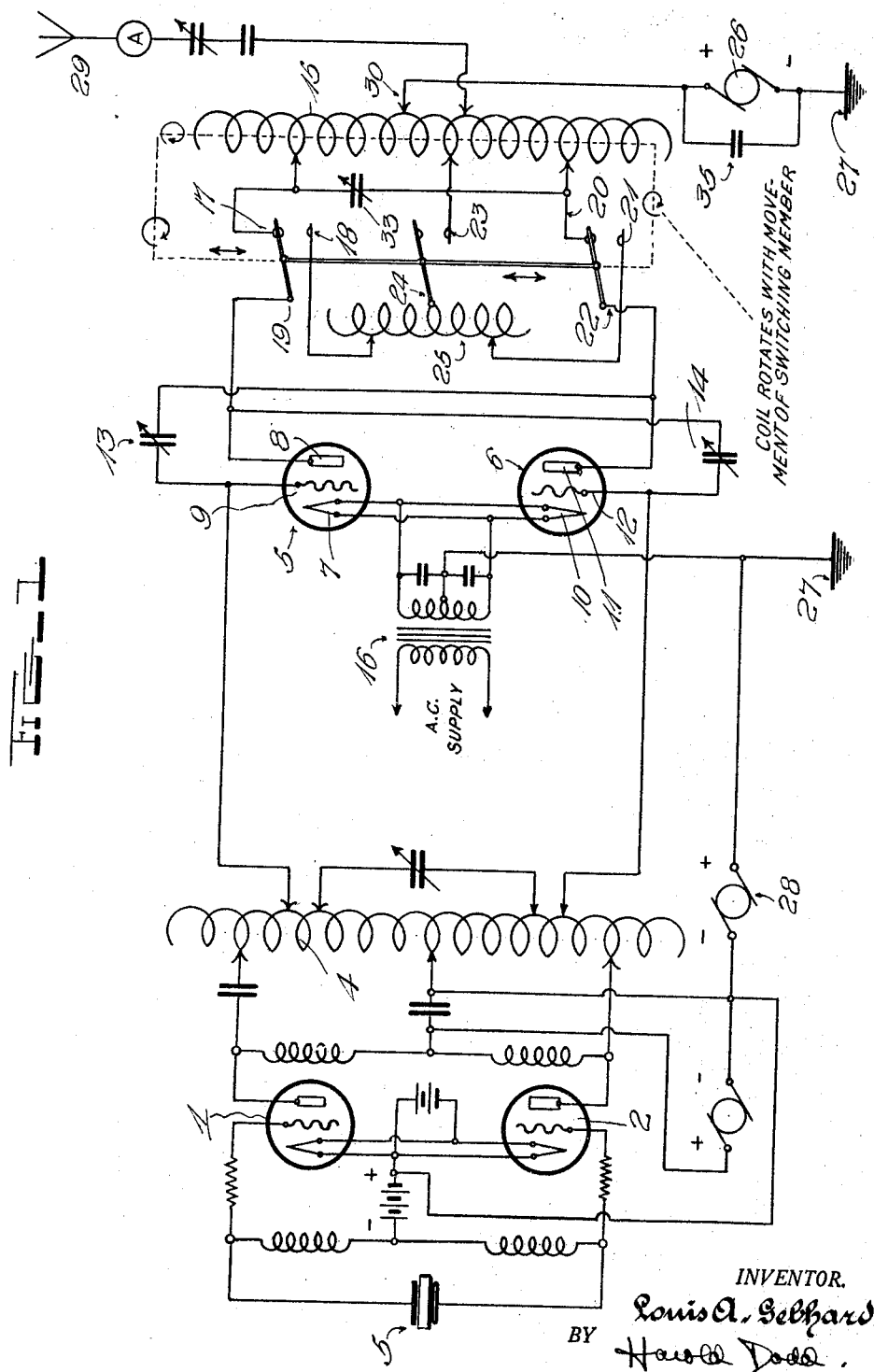
INVENTOR.
Louis A. Gebhard,
BY Harold Dodd.
ATTORNEY.

Aug. 30, 1932.          L. A. GEBHARD          1,874,958
COUPLING SYSTEM FOR HIGH FREQUENCY TRANSMITTERS
Filed Dec. 22, 1928          2 Sheets-Sheet 2

INVENTOR.
Louis A. Gebhard,
BY Harold Dodd.
ATTORNEY.

Patented Aug. 30, 1932

1,874,958

UNITED STATES PATENT OFFICE

LOUIS A. GEBHARD, OF WASHINGTON, DISTRICT OF COLUMBIA, ASSIGNOR, BY MESNE ASSIGNMENTS, TO WIRED RADIO, INC., OF NEW YORK, N. Y., A CORPORATION OF DELAWARE

COUPLING SYSTEM FOR HIGH FREQUENCY TRANSMITTERS

Application filed December 22, 1928. Serial No. 327,982.

My invention relates to coupling systems in general and more specifically to coupling systems employed in high frequency signaling systems.

An object of my invention is to provide certain improvements in coupling systems of the type employed in high frequency transmitting systems.

Another object of my invention is to provide a coupling system whereby the high frequency energy of the transmitter may be doubled, tripled or quadrupled in frequency.

Still another object of my invention is to provide a coupling system whereby the frequency of a transmitting system may be doubled, tripled or quadrupled and whereby the proper balance and adjustment of the circuits so coupled is assured at each frequency adjustment.

Figure 4:
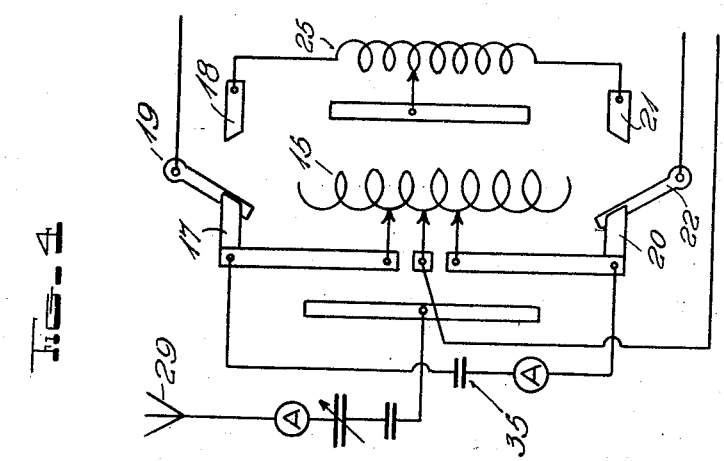
Figure 3:
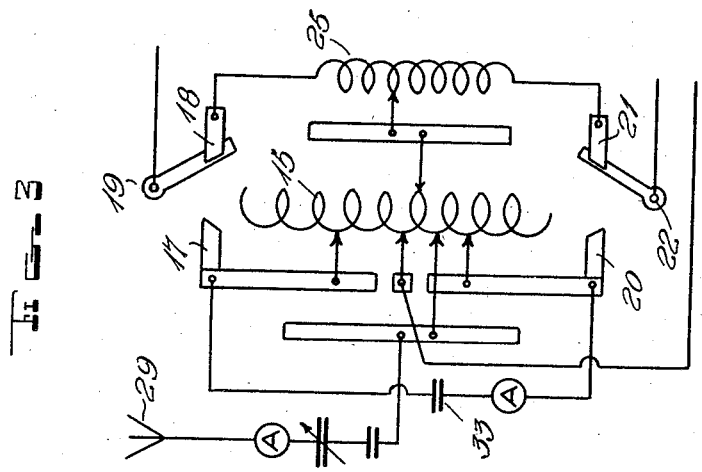
Figure 2:
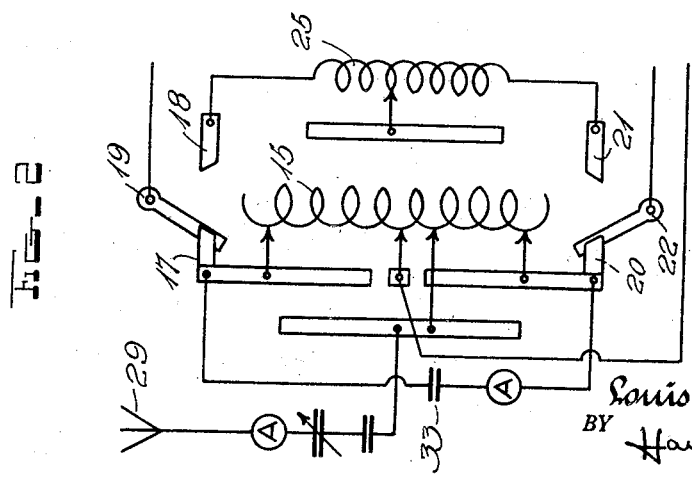

Other and further objects of my invention reside in the frequency changing system for high frequency transmitters as set forth in the following specification and shown in the accompanying drawings wherein, Fig. 1 is a schematic circuit arrangement of a transmitting system employing the coupling system of my invention and Figs. 2, 3 and 4 are diagrammatic illustrations of the coupling system of my invention.

In a high frequency radio transmitter designed to operate over a large band of frequencies it is desirable to use balanced circuits as the symmetrical arrangement of these circuits provide improved operation. In order that the full frequency band may be employed, the vacuum tubes may be caused to operate as straight amplifiers, frequency doublers or frequency triplers depending on the part of the frequency band in which the transmitter is caused to operate. In order that the circuits may be changed from singling to doubling or tripling the frequency, certain connections must be changed. It is important that the proper adjustments and balancing are provided on each of the frequency adjustments. It is frequently desirable to employ a transmitting system which may be readily and efficiently changed to operate on the desired frequency.

Figure 1 is a schematic circuit diagram showing a balanced thermionic tube generator 1, 2 having a quartz or mechanically vibratile element 3 provided for maintaining the frequency characteristics of constant value. Two thermionic tubes 5 and 6 are associated with the output circuit 4 of high frequency generator 1, 2. Thermionic tubes 5 and 6 are connected in a balanced circuit arrangement, the control electrodes 9 and 12 thereof associated with inductance 4. Cathode circuits 7 and 10 of thermionic tubes 5 and 6 respectively are energized by source of potential 16. Anode electrodes 8 and 11 of thermionic tubes 5 and 6 respectively are energized by source of potential 26 by way of connector 30, inductance 15, contacts 17 and 20 and switch members 19 and 22 respectively. A source of potential 28 provides the proper operational potential for control electrodes 9 and 12 of thermionic tubes 5 and 6, respectively. Thermionic tubes 5 and 6 are electrically balanced by means of capacities 13 and 14. This balancing arrangement provides the input and output circuits of the respective tubes with the proper potential and equalizes the energy between the two. A capacity 33 is provided in the output circuits of thermionic tubes 5 and 6 connected in parallel with inductance 15. A load circuit 29, 27 is associated with inductance 15. Load circuit 29, 27 is herein illustrated as a space radio radiating system. However, it is obvious that additional amplifiers, frequency doublers or triplers may be associated with inductance 15 in like manner. An inductance 25 is provided having connections therefrom to switch member 24 and contacts 18 and 21. Contact member 23 is electrically connected to inductance 15. Switch members 19, 24 and 22 are mechanically connected to operate in unison. In the circuit arrangement as illustrated, the anode circuits of thermionic tubes 5 and 6 are completed to inductance 15 by switch members 19 and 22 and contacts 17 and 20, respectively. Capacity 35 is provided for excluding high frequency energy from source of potential 26.

The operation of the coupling system of my invention is as follows: The input circuits of thermionic tubes 5 and 6 are energized by high frequency energy from thermionic tubes 1 and 2. The output circuits of thermionic tubes 5 and 6 are adjusted to a frequency value corresponding approximately to the frequency value of the exciting energy or any odd or even multiple thereof. Inductance 25 is adjusted to a frequency value corresponding to any even multiple of the frequency of the input circuit. For concreteness of explanation, suppose we assume that the frequency of the exciting energy is of the order of 3000 kilocycles and that inductance 25 is of such a value as when associated with thermionic tubes 5 and 6, the frequency characteristics of the output circuit will be of the order of 6000 kilocycles. In the accompanying drawings, anodes 8 and 11 of thermionic tubes 5 and 6 are connected to switch members 19 and 22, respectively, and as illustrated, complete the anode circuits by contacts 17 and 20, respectively, and inductance 15. A change of frequency is easily and quickly accomplished by causing switch members 19, 24 and 22 to connect with contact members 18, 23 and 21, respectively. The latter adjustment provides an output circuit for thermionic tubes 5 and 6 wherein the frequency characteristics are of the order of 6000 kilocycles. The output circuit in the latter case includes inductance 25. High frequency energy from the circuit including inductance 25 is transferred to a high frequency tank circuit comprising inductance 15 and capacity 33. A load circuit 29–27 may be associated with high frequency tank circuit 15–33. Frequency values of any odd multiple may be obtained by causing switch members 19 and 22 to engage with contact members 17 and 20, respectively, and switch member 24 to be disconnected from contact member 23. The symmetrical arrangement of the circuits is maintained at each frequency adjustment. The frequency value of coil 15 may be simultaneously adjusted when a change in the operational frequency is desired by mechanically rotating the coil or connections with the common mechanical movement of switch members 19, 24 and 22. Any number of inductances similar to inductance 25 may be employed and individual contact members associated therewith, whereby adjustments for doubling or quadrupling the frequency may be had. The characteristics of the load circuit 27–29 may be simultaneously varied with each change of the exciting frequency and caused to vary with the movement of the common switch member. Similar coupling arrangements may be employed for interconnecting any number of balanced amplifiers and the symmetrical arrangement of the circuits maintained at each frequency adjustment.

Figs. 2, 3 and 4 are diagrammatic illustrations showing the coupling system of my invention in greater detail. Fig. 2 shows the position of the switch members and electrical circuit for operating on the fundamental frequency. Figs. 3 and 4 show the positions of the switch members and the electrical circuit for doubling and tripling the frequency, respectively. Reference characters shown in Figs. 2, 3 and 4 correspond to those of Fig. 1.

In the accompanying drawings, generators are illustrated as sources of energy. It is obvious that any suitable source may be employed. Three electrode thermionic tubes are shown, however, it is obvious that thermionic tubes having four or more electrodes may be employed in the coupling system of my invention. The values of frequency referred to in the foregoing specification are arbitrary and merely for the purpose of explanation.

I realize that many modifications of the coupling system of my invention are possible without departing from the scope of my invention as defined in the following claims, and it is understood that my invention shall not be restricted to the accompanying drawings or the foregoing specification, but only as defined in the appended claims.

What I claim as new and desire to secure by Letters Patent of the United States is as follows:

1. In a high frequency transmitting system employing thermionic tubes in a balanced circuit arrangement the combination of a tuned input circuit a plurality of output circuits each having frequency characteristics differing from the other such that the resonant frequency of each is some multiple of the resonant frequency of the input circuit, means for impressing upon said input circuit a characteristc frequency, a plurality of switch members associated with said circuits and means for simultaneously actuating each of said switch members whereby said circuits may be interchangeably connected to said thermionic tubes.

2. In a high frequency transmitting system employing thermionic tubes in a balanced circuit arrangement, means for impressing on said tubes a characteristic control frequency, a plurality of oscillatory circuits each having frequency characteristics differing from the other such that the resonant frequency of each is some multiple of the impressed frequency, and means for interchangeably associating said oscillatory circuits with said thermionic tubes without destroying the symmetry of said balanced circuit arrangement.

3. In a high frequency transmitting system employing a plurality of thermionic tubes in an electrically balanced circuit arrangement the combination of means for impressing on said tubes a control frequency a plurality of oscillatory circuits each having frequency characteristics differing from the other and such that the resonant frequency of each is some multiple of the resonant frequency of the input circuit and means for interchangeably associating said oscillatory circuits with said thermionic tubes whereby the symmetry of said balanced circuit arrangement is maintained.

4. In a high frequency transmitting system employing a plurality of thermionic tubes in a balanced circuit arrangement, the combination of means for impressing on said tubes a control frequency, a plurality of oscillatory circuits each having frequency characteristics differing from the other and such that the resonant frequency of each is some multiple of the resonant frequency of the input circuit and means for interchangeably associating said oscillatory circuits with said thermionic tubes.

5. In a high frequency transmitting system employing thermionic tubes in a balanced circuit arangement, means for impressing on said tubes a control frequency, an oscillatory circuit having a resonant frequency that is a multiple of said control frequency associated with said thermionic tubes, a load circuit associated with said oscillatory circuit, a second oscillatory circuit having frequency characteristics differing from said first mentioned oscillatory circuit having a resonant frequency that is another multiple of said control frequency and means for associating said last mentioned circuit with said thermionic tubes and simultaneously connecting the electrical centers of said oscillatory circuits.

6. In combination two thermionic vacuum tubes each having cathode, anode and control electrodes, an inductance interconnecting the grid electrodes of said tubes, means for impressing on said inductance a fundamental frequency, a plurality of resonant circuits adapted to be connected in the anode circuit of said tubes, each said resonant circuit being resonant to a different frequency and each said frequency being some multiple of said fundamental frequency and means for selectively connecting said resonant circuits one at a time in the anode circuit of said tubes whereby different frequency multiplications may be made.

7. In a high frequency transmitting system employing thermionic tubes in an electrically balanced circuit arrangement, an input circuit for said tubes, means for impressing on said input circuit a control frequency an output circuit associated with said tubes, a load circuit associated with said output circuit, an oscillatory circuit having a resonant frequency that is a multiple of said control frequency, means for interchangeably associating said output circuit and said oscillatory circuit with said thermionic tubes and means for simultaneously associating said output circuit and said oscillatory circuit.

LOUIS A. GEBHARD.